(12) United States Patent
Kopelman et al.

(10) Patent No.: US 7,852,850 B2
(45) Date of Patent: Dec. 14, 2010

(54) DOUBLE-HASH LOOKUP MECHANISM FOR SEARCHING ADDRESSES IN A NETWORK DEVICE

(75) Inventors: Yaniv Kopelman, Holon (IL); Ruven Torok, Tel Aviv (IL); Dan Aharoni, Beit Horon (IL)

(73) Assignee: Marvell Israel (M.I.S.L.) Ltd. (IL)

( * ) Notice: Subject to any disclaimer, the term of this patent is extended or adjusted under 35 U.S.C. 154(b) by 1212 days.

(21) Appl. No.: 11/412,672

(22) Filed: Apr. 26, 2006

(65) Prior Publication Data

US 2009/0274154 A1 Nov. 5, 2009

(51) Int. Cl.
*G06F 17/00* (2006.01)
*G06F 17/30* (2006.01)

(52) U.S. Cl. .................. 370/395.32; 707/705

(58) Field of Classification Search .......... 370/389, 370/392, 395.3, 395.31, 395.32, 400, 401; 707/101, 705–707
See application file for complete search history.

(56) References Cited

U.S. PATENT DOCUMENTS

| | | | |
|---|---|---|---|
| 5,542,087 A * | 7/1996 | Neimat et al. ............. 707/10 |
| 5,584,005 A * | 12/1996 | Miyaoku et al. ........... 711/206 |
| 5,848,423 A * | 12/1998 | Ebrahim et al. ............ 707/206 |
| 6,212,525 B1 * | 4/2001 | Guha ....................... 707/101 |
| 6,343,289 B1 * | 1/2002 | Hunter et al. .............. 707/10 |
| 6,754,662 B1 * | 6/2004 | Li ........................... 707/101 |
| 7,248,585 B2 * | 7/2007 | Kohn et al. ................ 370/392 |
| 2003/0210689 A1 * | 11/2003 | Davis et al. ............... 370/389 |
| 2006/0184556 A1 * | 8/2006 | Tan et al. .................. 707/101 |
| 2006/0221977 A1 * | 10/2006 | Basso et al. ............ 370/395.32 |
| 2006/0248095 A1 * | 11/2006 | Cozzani .................... 707/100 |

* cited by examiner

*Primary Examiner*—Pankaj Kumar
*Assistant Examiner*—Saba Tsegaye

(57) ABSTRACT

A hash function is applied to a set of data to generate a hash. A first subset of the hash is used to lookup an entry in a lookup table for a forwarding database. A second subset of the hash is used to identify, within the entry, data comprising an offset. The offset is applied to a location identified in the forwarding database by the first subset of the hash to determine an entry in the forwarding database. Optionally, the lookup mechanism is used in conjunction with one or more other forwarding databases. A method of updating the forwarding database within the double hash lookup framework is also described.

38 Claims, 9 Drawing Sheets

DOUBLE-HASH LOOKUP MECHANISM FOR SEARCHING ADDRESSES IN A NETWORK DEVICE

FIELD OF THE INVENTION

The present invention relates to computer networking in general, and, in particular, to a lookup mechanism for the forwarding of data packets.

BACKGROUND OF THE INVENTION

As data networks proliferate, and the number of ports on typical network devices grow, the size of forwarding tables may require expansion as well. In many such devices (e.g., switches or routers), the expansion of these forwarding tables may present challenges. A first challenge is that the lookup of an address in a forwarding database may take longer in a larger database, other factors being equal. Moreover, as transmission speeds increase, network devices must switch the data traffic at a faster rate to keep up with the inflow.

Network devices may employ various lookup mechanisms in order to switch data traffic in an efficient manner. Such devices may create forwarding tables that associate specific destination addresses (e.g., Medium Access Control (MAC) addresses, Virtual Local Area Network (VLAN) identifiers, etc.) with certain egress ports on the device. These forwarding tables may be indexed using a hash of each destination address entry. To lookup an address, a device may perform a hash function on a destination address of a data packet to be forwarded. The generated hash may then be matched to a hash entry in the forwarding table.

A hash function typically transforms a string of data into a fixed length value, or key, representing the original string. The fixed length is typically shorter than the original string. Hashing may be used to index and retrieve items because it is often faster to lookup an item using a shorter hashed key than it is to use the original string. Hashing may, therefore, provide efficiencies in a forwarding database.

However, as forwarding tables expand, the likelihood of hash collisions may increase as well. A hash collision occurs when two distinct inputs into a hash function produce identical outputs. As the number of destination addresses in a forwarding database grow, there is an increasing likelihood that more lookup keys will be mapped to identical indices. If the fixed length value of the hash function is increased to minimize collisions, the lookups may take longer. There is, thus, a need in the art for more efficient lookup mechanisms for forwarding tables in network devices.

BRIEF SUMMARY OF THE INVENTION

According to various embodiments of the invention, methods are described for a double hash lookup mechanism for a forwarding database (FDB). In certain embodiments, a hash function is applied to a set of data to generate a hash. A first subset of the hash is used to select an entry in a lookup table for the FDB. A second subset of the hash is used to identify, within the entry, data comprising an offset. The offset is combined with the first subset to identify an entry in the FDB. The entry is fetched from the FDB. Payload data associated with the set of data may be forwarded to a port specified by the entry. The forwarding may be to any forwarding entity, not necessarily a port. For example, the forwarding entity may be a trunk (logical port), a tunnel, or a group of ports.

In some embodiments, the lookup table is a table comprising a plurality of rows which is searchable by the first subset of the hash. The first subset of the hash identifies one or more rows in the lookup table (i.e., the entry in the lookup table), and the second subset of the hash is compared with information in the row to thereby identify the offset. The FDB comprises a plurality of rows which is also searchable by the first subset of the hash to identify an entry comprising one, or more, of the rows. In some embodiments, the hash is split into two parts comprising the first subset and the second subset, wherein the second subset comprises all of the hash not included in the first subset. In certain embodiments, after applying the hash function, the data may be further manipulated to create the hash.

In some embodiments, the set of data to which the hash function is applied is a selection from the following: (a) a destination Medium Access Control (MAC) address, (b) a destination MAC address and a Virtual Local Area Network address identifier (VLAN-ID), (c) a Destination Internet Protocol (DIP) address, (d) a Source Internet Protocol (SIP) address and a DIP address, (e) an SIP address, a DIP address, and a VLAN-ID, or (f) another set of data comprising an address. The hash function may be a cyclic redundancy check (CRC) hash.

In still other embodiments, another forwarding database is searched first, wherein it is determined that it does not have a valid entry corresponding to the set of data. This determination triggers the step of using the first subset of the hash to lookup the entry in a lookup table for the FDB.

In some embodiments, using a first subset and second subset of a hash, there is a determination that the FDB does not contain valid forwarding directions, and an entry in a different forwarding database may be found using the data address (or other data) to search the different forwarding database. Payload data is forwarded to a selection of egress ports specified by the entry in the different forwarding database. In some embodiments, the different forwarding database comprises Ternary Content Addressable Memory (TCAM) which includes a number of keys searchable by the data address.

In a variety of embodiments, an apparatus is described which is configured to perform the methods described above. The apparatus may comprise an ingress port, a number of egress ports, a parsing engine, a forwarding database controller, and a transmit unit. The apparatus may, for example, be a bridge, a switch, a router, or any combination thereof.

In certain embodiments of the invention, a method of learning an entry for a forwarding database (FDB) is described. A hash function is applied to data comprising an address to generate a hash. A first subset of the hash is used to lookup an entry in a lookup table for the FDB. Using a second subset of the hash to examine the entry, and a first offset is determined. A location in the FDB is determined using the first subset of the hash, and an available entry is identified within the first offset from the location in the FDB. The FDB is updated at the available entry with forwarding information associated with the data.

In some embodiments, the actual offset from the location in the FDB to the available entry is determined, and the entry in the lookup table is updated by associating the second subset of the hash with the amount of offset. In some embodiments, the hash function is applied to a second set of data to generate a second hash. When it is determined that the FDB does not contain an available entry, an available entry may be identified and updated in a different forwarding database.

According to another embodiment of the invention, an apparatus is configured with means to apply a hash function to a set of data to generate a hash. The apparatus is configured with means to use a first subset of the hash to lookup an entry in a lookup table for a forwarding database (FDB). The apparatus is further configured with means to use a second subset of the hash to identify, within the entry, data comprising an offset. The apparatus is configured with means to combine the offset with the first subset to identify an entry in the FDB. The apparatus is configured with means to fetch the entry from the FDB, and means to forward payload data associated with the set of data to a set of ports specified by an entry. In some embodiments, the apparatus is configured with means to determine that the FDB does not contain valid forwarding directions, and means to identify an entry in a different forwarding database. The apparatus may further be configured with means to perform the other methods described herein.

In other embodiments of the invention, an apparatus is configured with means of learning an entry for a forwarding database (FDB). The apparatus is configured with means to apply a hash function to data address to generate a hash. The apparatus is configured with means to use a first subset of the hash to lookup an entry in a lookup table for the FDB. The apparatus is further configured with means to use a second subset of the hash to examine the entry, and means to determine a maximum offset available. The apparatus is configured with means to determine a location in the FDB using the first subset of the hash, and means to identify an available entry within the maximum offset from the location in the FDB. The apparatus is configured with means to update the FDB at the available entry with forwarding information associated with the data comprising the address. The apparatus may further be configured with means to perform the other methods described herein.

Still other embodiments of the present invention may be implemented in code. In one embodiment, there is code to apply a hash function to a set of data to generate a hash. There is code to use a first subset of the hash to lookup an entry in a lookup table for a forwarding database (FDB). The embodiment includes code to use a second subset of the hash to identify, within the entry, data comprising an offset. There is code to combine the offset with the first subset to identify an entry in the FDB. There is code to fetch the entry from the FDB, and code to forward payload data associated with the set of data to a set of ports specified by an entry. In another embodiment, there is additional code to determine that the FDB does not contain valid forwarding directions, and code to identify an entry in a different forwarding database. There may also be additional code to perform the other methods described herein.

Another embodiment of the invention comprises code for learning an entry for a forwarding database (FDB). Such an embodiment includes code to apply a hash function to a data address to generate a hash. The embodiment includes code to use a first subset of the hash to lookup an entry in a lookup table for the FDB. The embodiment includes code to use a second subset of the hash to examine the entry, and code to determine a maximum offset available. There is code to determine a location in the FDB using the first subset of the hash, and code to identify an available entry within the maximum offset from the location in the FDB. There is code to update the FDB at the available entry with forwarding information associated with the data comprising the address. In other embodiments, additional code may be included to perform the other methods described herein.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
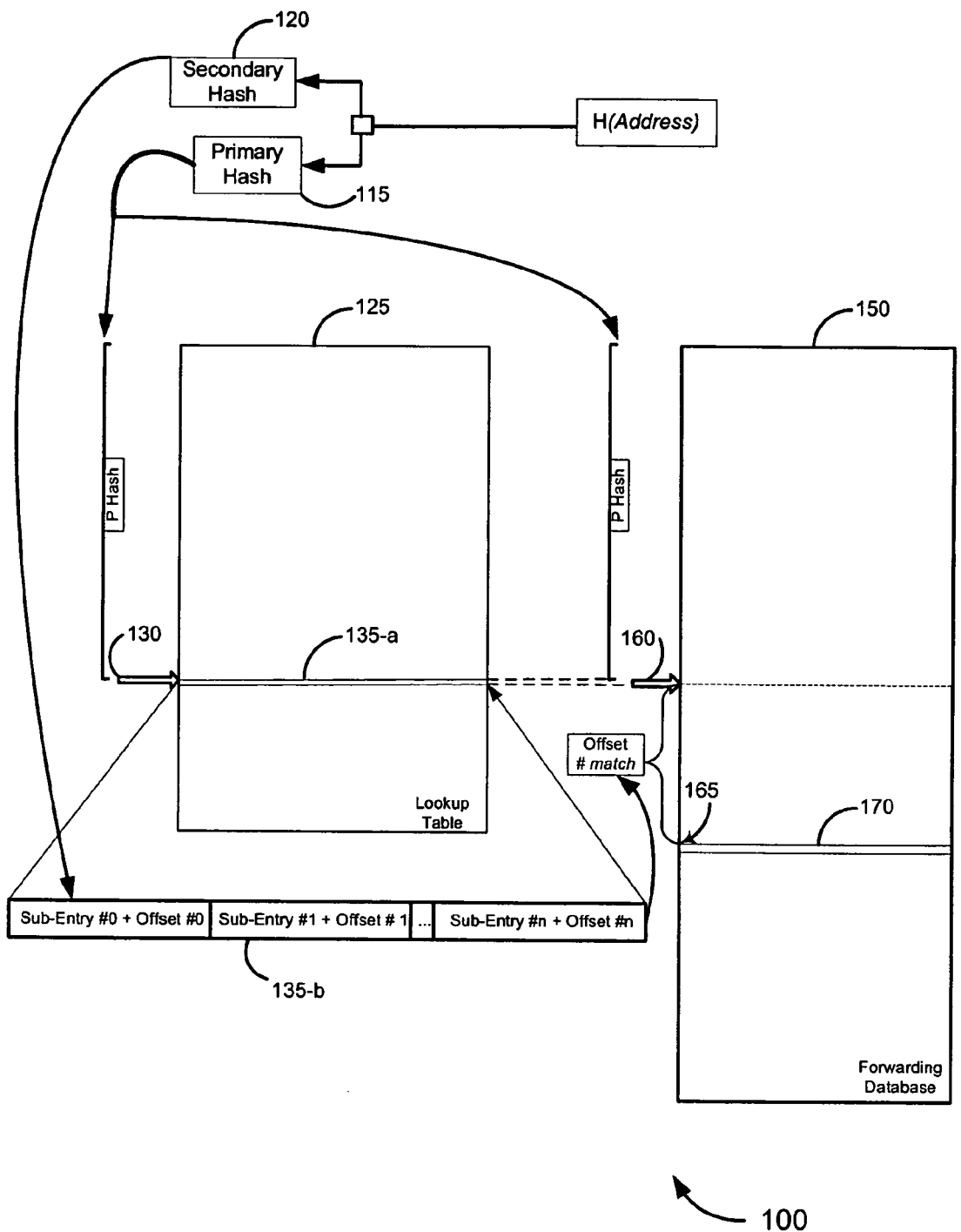
FIG. 1 is a simplified high-level diagram illustrating a double hash lookup mechanism according to various embodiments of the present invention.

This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention as set forth in the appended claims.

Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

It should also be appreciated that the following systems, methods, and software may be a component of a larger system, wherein other procedures may take precedence over or otherwise modify their application. Also, a number of steps may be required before, after, or concurrently with the following embodiments.

In accordance with embodiments of the present invention, entries in a forwarding database are identified using a double hash lookup mechanism. In some embodiments, a hash function is applied to a set of data to generate a hash. A first subset of the hash is used to lookup an entry in a lookup table for a forwarding database. A second subset of the hash is used to identify, within the entry, data comprising an offset. The offset is applied to a location identified in the forwarding database by the first subset of the hash to determine an entry in the forwarding database. In various embodiments, the methods of the invention are implemented in software, or with an apparatus described herein. In some embodiments, the lookup mechanism is used in conjunction with one or more other forwarding databases. A method of updating the forwarding database within the double hash lookup framework is also described.

I. Double Hash Lookup Mechanism

Various embodiments of the invention provide a lookup algorithm for a forwarding database. By way of example, the forwarding database may be embodied on a computer readable medium of a switch, bridge, router, or other network device. Such a device receives a data packet at an ingress port, and forwards the data packet (or perhaps the payload with a modified header) to a subset of the plurality of egress ports on the device. In some embodiments, the device may comprise a single integrated circuit. In various embodiments, the determination which governs the forwarding instructions for a given packet is made by accessing the forwarding database. The forwarding database may be organized as a table in which a destination address (or a subset or hash thereof) is associated with forwarding instructions (e.g., specific egress ports).

FIG. 1 sets forth a block diagram 100 providing a high level overview of an exemplary embodiment of a double hash lookup mechanism associated with the forwarding database. Data comprising a destination address is received. The data may include one or more of the following (a) a destination MAC address, (b) a destination MAC address and a VLAN-ID, (c) a Destination Internet Protocol (DIP) address, (d) a Source Internet Protocol (SIP) address and a DIP address, (e) a SIP address, a DIP address, and a VLAN-ID, (f) any combination of the foregoing addresses, or (g) any other set of data comprising or otherwise correlated with a destination address. The data address may be parsed from a received data packet after arrival at a device, or it may be received in any other manner known in the art. By way of example, an parsing engine may extract a destination MAC address and VLAN-ID from an incoming MAC frame, and buffer the data.

A hash function is applied to the destination address data to generate a hash value (alternatively referred to below as a "hash"), In some embodiments, the hash function is a cyclic redundancy check (CRC) hash, or an XOR based hash. In one embodiment, the hash function is a 32-bit CRC hash (CRC-32). However, any number of other hash functions may be used, such as SHA-1, MD5, RIPEMD, or ADLER32, without limitation. The hash function may be selected to optimize distribution of keys equally around the lookup database and forwarding database described below. For purposes of discussion, the output of the application of the hash function to the address is the "hash." Note that the hash functions may be applied one or more times, and may be applied alone or in combination, to create the hash. In some embodiments, the initial output of a hash function is further modified to create the hash.

Regardless of the particular embodiment, the generated "hash" is divided into, for example, two segments, namely the primary hash 115, and the secondary hash 120. In some embodiments, a first subset of the hash is the primary hash 115, and a second, different subset of the hash is the secondary hash 120. In certain embodiments, the hash is split into two parts comprising the first subset and the second subset, and the second subset comprises all of the hash not included in the first subset (i.e., the remainder). However, it is worth noting that the primary and secondary hash need not correlate with each bit of the hash (i.e., part of the hash may not be in either the primary or secondary hash). Moreover, there may be overlap between the primary and secondary hash. In certain embodiments using a 32-bit hash, the primary hash may be 21-24 bits, and the secondary hash 8-11 bits.

FIG. 1 further illustrates a lookup table 125 used to identify entries in the forwarding database. The lookup table 125 may be configured in any fashion known in the art which provides for the lookup and retrieval of information. The lookup table may be embodied on one or more computer readable media of the network device. The lookup table 125 may be specifically configured to resolve collisions in the forwarding database. The lookup table, in some embodiments, is made up of a number of rows. In various embodiments, the primary hash is used to lookup a location 130 in the lookup table. Thus, the primary hash may be used as a key to search the lookup table. In some embodiments, the primary hash is added to a base address to specifically identify a row (or rows). However, the primary hash may be used in any manner known in the art to identify any location or set of locations in the lookup table.

While noting that the primary hash may be used to identify any location or locations in a lookup table 125, for purposes of discussion the reference shall from this point forward be to a row. However, similar principles will apply to a broader location as well (i.e., a plurality of rows could have similar entries, and be searched in a similar fashion). Reference numeral 135-*a* identifies a row identified in the lookup table by the primary hash. Reference numeral 135-*b* illustrates an example of the contents of such a row. For exemplary purposes only, 135-*b* shows a row wherein different searchable sub-entries are associated with different offsets. Thus, a particular sub-entry (#0) is associated with a particular offset (#0); particular sub-entry (#1) is associated with a particular offset (#1); and so on up to a particular sub-entry (#n) being associated with a particular offset (#n). Each sub-entry may be associated (or otherwise linked) with its corresponding offset in any manner known in the art. The sub-entries comprise secondary hash entries which may be matched with the generated secondary hash to identify the appropriate offset, as discussed below.

The identified row 135 is searched using the secondary hash 120. The secondary hash 120 functions as a key to identify a matching sub-entry (comprising different secondary hashes) in the identified row 135. While in some embodiments the secondary hash 120 may function as a key to identify a matching entry, the secondary hash may be used with other search or lookup methods known in the art, as well. Once the sub-entry has been matched, the associated offset may be referenced, buffered, or otherwise stored in a memory, in any manner known in the art. This offset may, therefore, be linked or otherwise associated with the address and hash, as well as the primary hash 115 and secondary hash 120.

Turning now to the forwarding database 150 (also referred to elsewhere herein as a forwarding table), it may be configured in any manner known in the art which provides for the lookup and retrieval of information. The forwarding database 150 may contain forwarding and handling decisions for the matching destination addresses. In some embodiments, the forwarding and handling information comprises a list of egress ports to be associated with an entry (e.g., a destination address or hash thereof). The forwarding database may be embodied on one or more memories, which may be either on chip or external. The forwarding database 150, in some embodiments, is made up of a number of rows. In various embodiments, the primary hash 115 is used to lookup a location 160 in the forwarding database. Thus, the primary hash may be used as a key to search the forwarding database 150. In certain embodiments, the primary hash is added to a base address to identify a pointer 160 pointing to an entry in the forwarding database 150. In other embodiments, the primary hash may be used in conjunction with other information or input to identify or lookup the location.

From the location (or pointer) 160, the offset is applied to identify a second location 165. By way of example, the offset may comprise the number contained in the offset field, which may be added (e.g., by an adder in the network device) to the location. Alternatively, the offset may be subtracted from the location to determine the-entry. However, the offset may also be a more complex algorithm (or input thereto) that directs or points to an entry in the forwarding database 150 from the location 160 identified by the primary hash. In the present embodiment, the offset identifies the entry 170 in the forwarding database 150 associated with the received data address. The entry 170 may comprise a row, a subset of a row, a number of rows, or any other specified location in the forwarding database. The forwarding and handling information is fetched from the entry in the forwarding database 150, and this may be accomplished in any manner known in the art. In some embodiments, the data packet (or payload of the data packet and a modified header) is forwarded and handled as directed in the entry. In certain embodiments, the packet is forwarded to a subset of the egress ports specified in the entry. The forwarding may to any forwarding entity, not necessarily a port. The forwarding entity may be a trunk (logical port), a tunnel, or a group of ports.

It is worth noting that the double hash lookup mechanism described above may be used in conjunction with other forwarding databases. For example, in one embodiment, a different forwarding database is initially searched. If it is determined that the different forwarding database does not have a valid entry corresponding to the data address, that determination triggers the double hash lookup mechanism described above.

Also, turning again to FIG. 1, it may be determined that there is no match for the secondary hash 120 in the identified location 135 in the lookup table. Or, perhaps, no valid entry is found in the forwarding database 150. If such scenarios occur, the forwarding information for an address will, in some embodiments, be searched for in an additional forwarding database. The additional forwarding database may comprise a TCAM. The addition of such a TCAM allows for additional storage of entries of forwarding information that could not be stored in the lookup table 125 and forwarding database 150 because of collisions (or other reasons). This additional forwarding database may be configured in any fashion known in the art which provides for the lookup and retrieval of information. The additional database may contain forwarding and handling decisions for the matching destination addresses. In some embodiments, the forwarding and handling information comprises a list of egress ports to be associated with an entry. The additional forwarding database may be embodied on one or more memories. The additional forwarding database, in some embodiments, may be made up of a number of rows. In some embodiments, the destination address itself (e.g., MAC and VLAN-ID) comprises the key to be used to search the TCAM. However, in other embodiments, alternative methods known in the art may be used to search the additional forwarding database (e.g., a second hash function may be used as a lookup key, or the original hash or subset thereof may be used). The payload of the packet may be forwarded according to the entry in the additional forwarding database.

Figure 2:
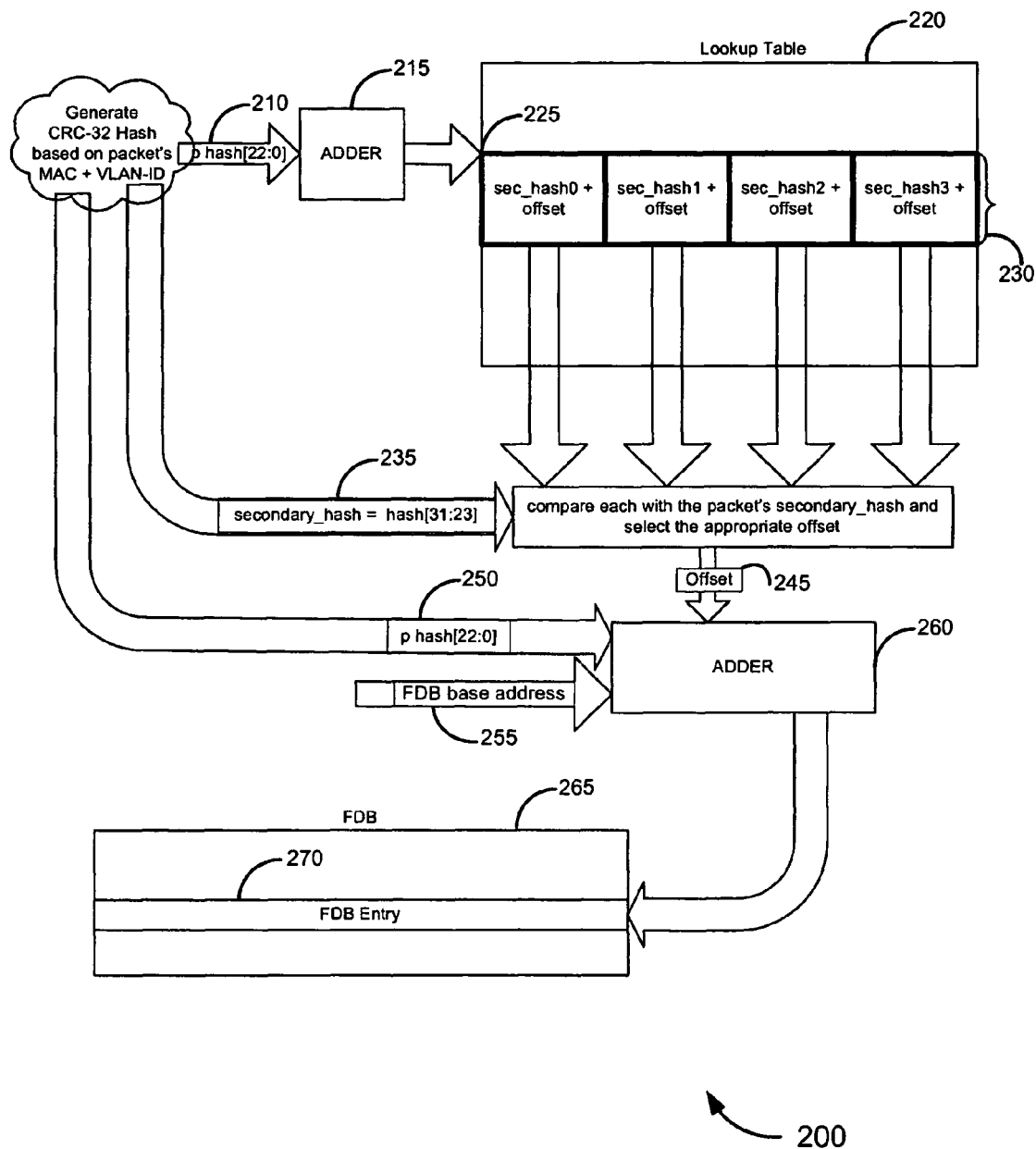
FIG. 2 is a simplified diagram illustrating a double hash lookup mechanism using a 32-bit cyclic redundancy check hash according to various embodiments of the present invention.

FIG. 2 is a simplified diagram 200 illustrating a double hash lookup mechanism using a 32-bit cyclic redundancy check (CRC-32) hash according to various exemplary embodiments of the present invention. A 32-bit hash is generated using a CRC-32 hash function on a destination MAC address and VLAN-ID parsed from a data packet. A primary hash 210 is identified comprising 23 bits [22:0] of the 32-bit hash, and forwarded. Adder 215 adds the primary hash 210 to a base address in the lookup table 220, to identify a pointer 225 that identifies a row 230 in the lookup table 220. In the row 230, different secondary hash entries are associated with different offsets.

The remaining 9 bits [31:23] of the 32-bit hash form the secondary hash 235. The secondary hash 235 is compared with entries from the row 230 to identify a match, and thereby select the appropriate offset. Adder 260 adds forwarding database base address 255, the primary hash 250, and the offset 245 together to identify an entry 270 in the forwarding database 265.

II. Double Hash Update Mechanism

Figure 3:
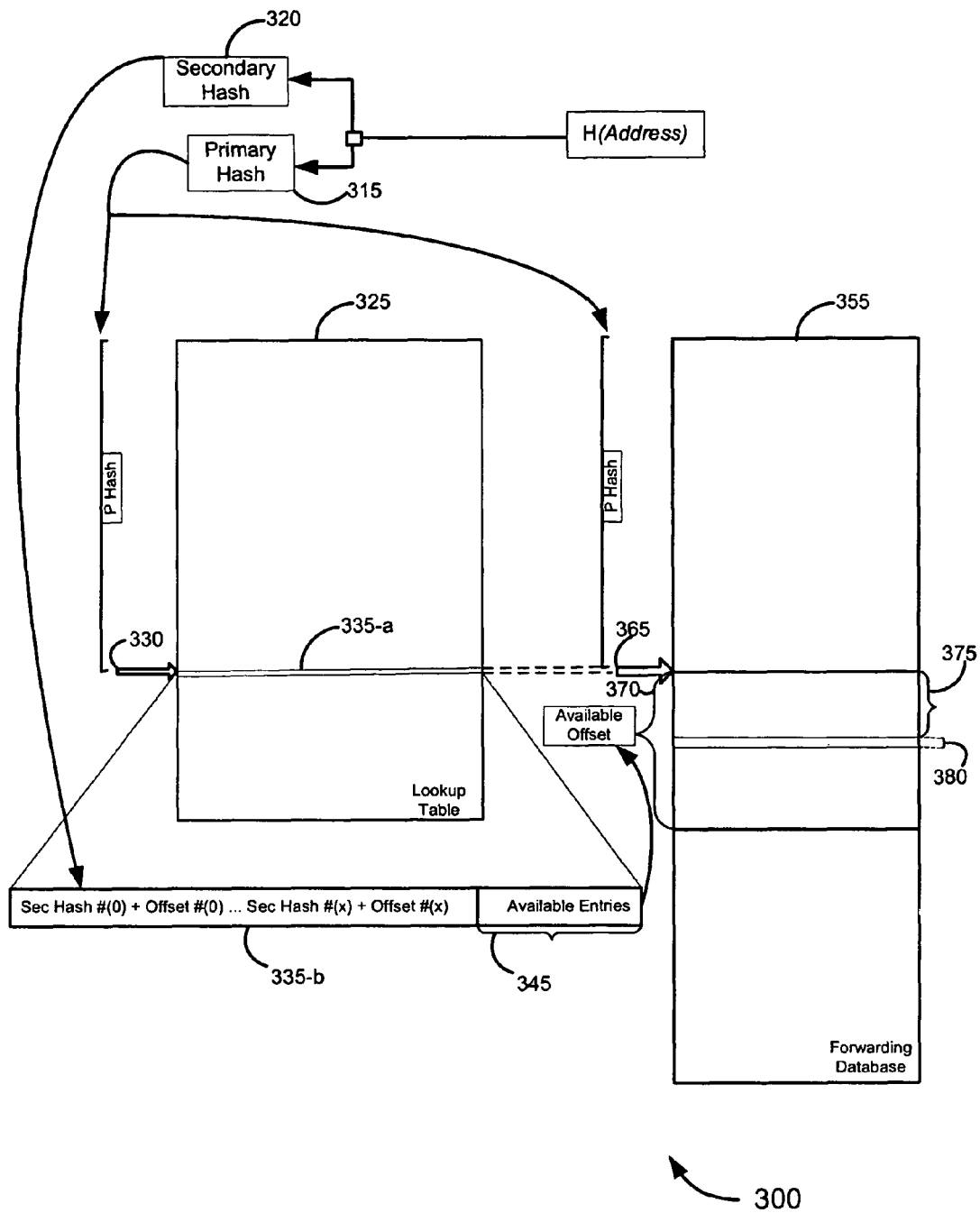
FIG. 3 is a simplified high-level diagram illustrating the updating functionality of the double hash lookup mechanism according to various embodiments of the present invention.

FIG. 3 sets forth a block diagram 300 providing a high level overview of an exemplary embodiment of the double hash update mechanism associated with a forwarding database. Data comprising a destination address may be received, and the destination address may be associated or otherwise linked with new or updated forwarding or handling information. The data may comprise any of the address formats discussed above.

As described above, a hash function is applied to the destination address data. Part of the hash is then identified as the primary hash 315, and part of the hash is deemed the secondary hash 320. In some embodiments, and as discussed above, a first subset of the hash is the primary hash 115, and a second, different subset of the hash is the secondary hash 120. The descriptions of the various configurations of the primary and secondary hash are also applicable to the updating embodiments.

FIG. 3 again illustrates a lookup table 325 for the forwarding database. The lookup table 325 may be configured as discussed above for the "lookup" embodiments. The primary hash may be used to search for and identify a location 330 in the lookup table in any of the ways described above for the "lookup" embodiments. Reference numeral 335-*a* identifies a location comprising a row which has been identified in the lookup table by the primary hash. Reference numeral 335-*b* illustrates an example of the contents of such a row. For exemplary purposes only, 335-*b* shows a row wherein different entries are associated with different offsets. Thus, a particular sub-entry (#0) is associated with a particular offset (#0); and so on up to a particular sub-entry (#x) being associated with a particular offset (#x). Each entry may be associated with its corresponding offset in any manner known in the art. The sub-entries comprise secondary hash entries which may be matched with a generated secondary hash to identify the appropriate offset, as discussed elsewhere herein. The row (or broader location) may be searched to identify the available entries 345. An entry may be available due to the fact that it is empty, has aged beyond specified parameters without valid updating, or that it is otherwise invalid. The field size of the secondary hash 320 may be referenced to allow the row 335 to be more accurately searched. The search of the row may yield information which indicates a range of available offsets, and is stored in memory that may be associated in the row with a secondary hash of the stated field size. In some embodiments, a maximum available offset may be similarly obtained. In still other embodiments, the offsets selected may be in ranges with different preference levels.

Turning now to the forwarding database 355 (also referred to elsewhere herein as a forwarding table), it may be configured as detailed above for the "lookup" embodiments. In various embodiments, the primary hash is used to lookup a location 365 in the forwarding database 355, in any manner as described above. Thus, the primary hash may be used as a key to search the forwarding database 355. In certain embodiments, the primary hash is added to a forwarding database 355 base address to identify a pointer 365 in the forwarding database. In other embodiments, the primary hash is used in conjunction with other information or input to identify the location, in any manner as known in the art.

From the location (or pointer) 365, the maximum offset is applied to determine the region 370 of the forwarding database that may be used for an entry. By way of example, the offset may comprise the number from the offset field, which is added (e.g., by an adder in the network device) to the location. Alternatively, the offset may be subtracted from the location to determine the entry. However, the offset may also be a more complex algorithm that directs or points to an entry in the forwarding database from the location identified by the primary hash. However, in this exemplary embodiment, the offset is illustrated as a region 370 that is added to a pointer.

In this exemplary embodiment, a first area 375 of the region 370 is searched, wherein it is determined that no area for entries is available. An "available" entry may be empty location, a location that is invalid due to aging, or a location that is otherwise determined to be invalid. However, once an available entry is found, as illustrated at block 380, the forwarding database is updated at the available entry with forwarding information (e.g., a set of egress ports) associated with the address. In some embodiments, the lookup table 325 is updated to associate the second subset of the hash 320 with identified offset. Thus, for example, the row 335 in the lookup table (identified by the first subset of the hash) may be modified to include the second subset of the hash and an association or other link to an offset field entry.

It is worth noting that the double hash update mechanism described above may be used in conjunction with other forwarding databases. For example, if there is no "available" entry 345 in the lookup table location 335 identified by the primary hash of a destination address, the forwarding and handling information for the destination address may be stored in another forwarding database. Similarly, if there is no entry available in the offset region 370, the forwarding and handling information for the destination address may be stored in the other forwarding database. The additional forwarding database may be configured in any manner known in the art, as described above. For example, the additional forwarding database may be a TCAM, which is indexed by entries of destination addresses. There is further discussion of the use of an additional database with the update mechanism below.

III. Additional Exemplary Embodiments

Figure 4:
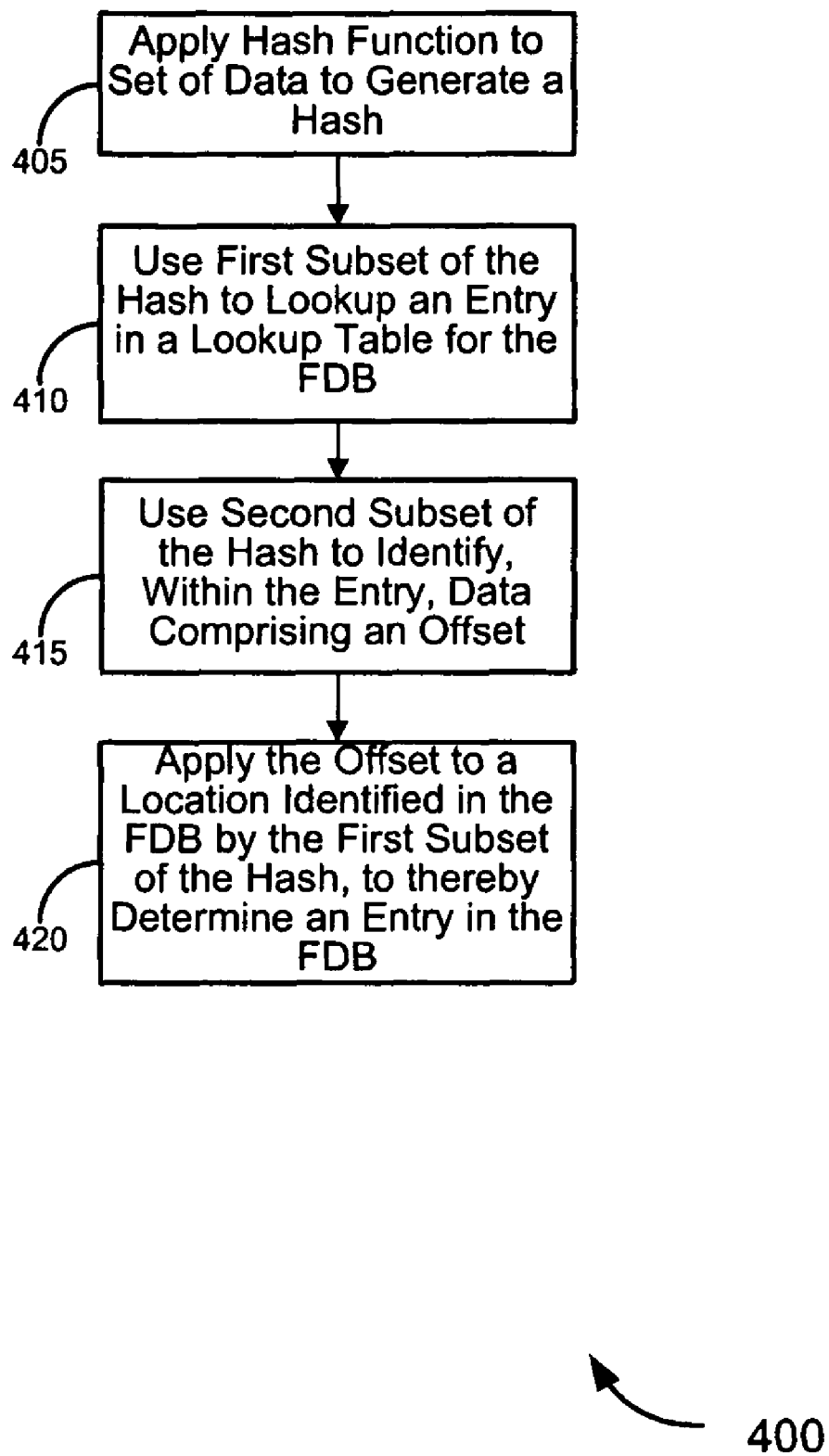
FIG. 4 is a flowchart illustrating a double hash lookup mechanism according to various embodiments of the present invention.

FIG. 4 is a flowchart 400 of steps performed to determine an entry in a forwarding database, in accordance with one exemplary embodiment of the present invention. At step 405, a hash function is applied to a set of data to generate a hash. At step 410, a first subset of the hash is used to lookup an entry in a lookup table for the forwarding database (FDB). At step 415, a second subset of the hash is used to identify, within the entry, data comprising an offset. At step 420, the offset is applied to a location identified in the FDB by the first subset of the hash to thereby determine an entry in the FDB.

Figure 5:
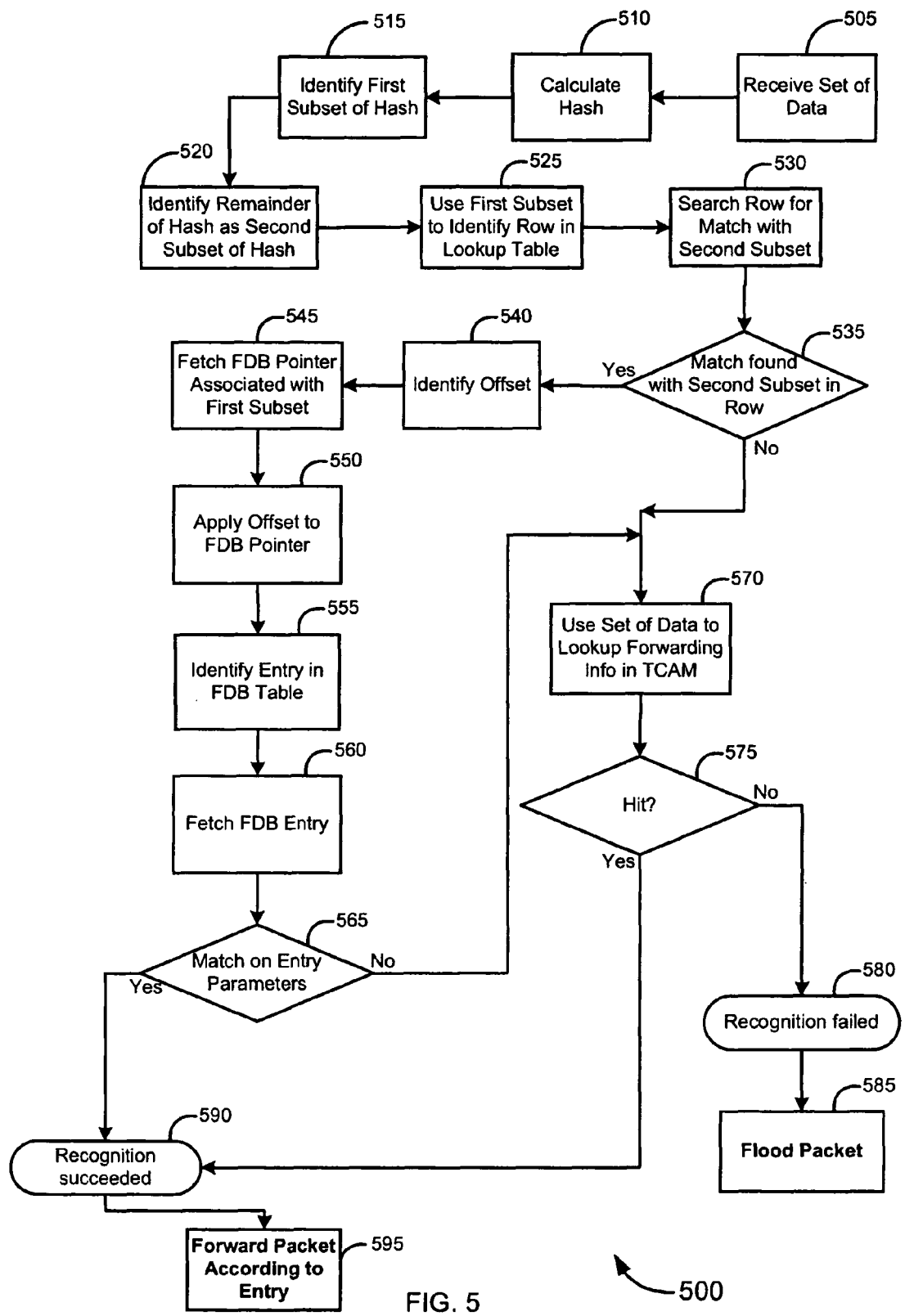
FIG. 5 is a flow diagram illustrating a double hash lookup mechanism used in conjunction with an additional forwarding database according to various embodiments of the present invention.

FIG. 5 is a flowchart 500 of steps performed to determine an entry in a forwarding database, in accordance with another exemplary embodiment of the present invention. At step 505, a set of data is received by a device (e.g., a switch or bridge). The set of data may comprise a destination address from the header of a frame received by the device. A hash function is applied to the set of data to thereby calculate a hash, at step 510. A first subset of the hash is identified at step 515, and a second subset of the hash is identified at step 520. In some embodiments, the second subset may comprise the part of hash not included in the first subset. At step 525, the first subset is used as a key to search a lookup table for a forwarding database (FDB) to identify a row in the look-up table. (Note that in other embodiments, the first subset may identify a plurality of rows, or any other specified location(s) in memory of a lookup table). At step 530, the identified row is searched using the second subset of the hash as a key.

At step 535, a match with the second subset may be found in the identified row. If the match is found, an offset which is associated with the matched second subset is identified at step 540. The offset may, in some embodiments, comprise a 5-7 bit data field. At step 545, the first subset of the hash is used to identify a pointer in the FDB. In some embodiments, the first subset of the hash is added to a base address in the FDB to determine the pointer location. At step 550, the offset is applied to the pointer (e.g., by adding the offset amount to the pointer) to thereby identify an entry in the FDB at step 555. At step 560, the FDB entry is fetched. At step 565, a determination may be made as to whether there is a match on the entry parameters. If so, recognition is deemed successful, at step 590. The payload of the packet is forwarded according to the entry, at step 595.

Returning to step 535, if the match was not found, the forwarding information is searched for, at step 575, in a second forwarding database which comprises a TCAM. Similarly, if there was no match on the entry parameters at step 565, the forwarding information is searched for, at step 570, in a second forwarding database. The set of data (e.g., a destination address) comprises the key to be used to search the TCAM. However, in other embodiments, alternative methods known in the art may be used to search the second forwarding database (e.g., a second hash function may be used as a lookup key, or the original hash or subset thereof may be used). If, at step 575, a match is found, recognition is deemed successful, at step 590. The payload of the packet is forwarded according to the entry in the second forwarding database, at step 595. Returning to step 575, if no match is found in the second forwarding database, recognition is deemed to have failed at step 580, and the packet is flooded to all egress ports at step 585. In other embodiments, such a packet may be dropped.

Figure 6:
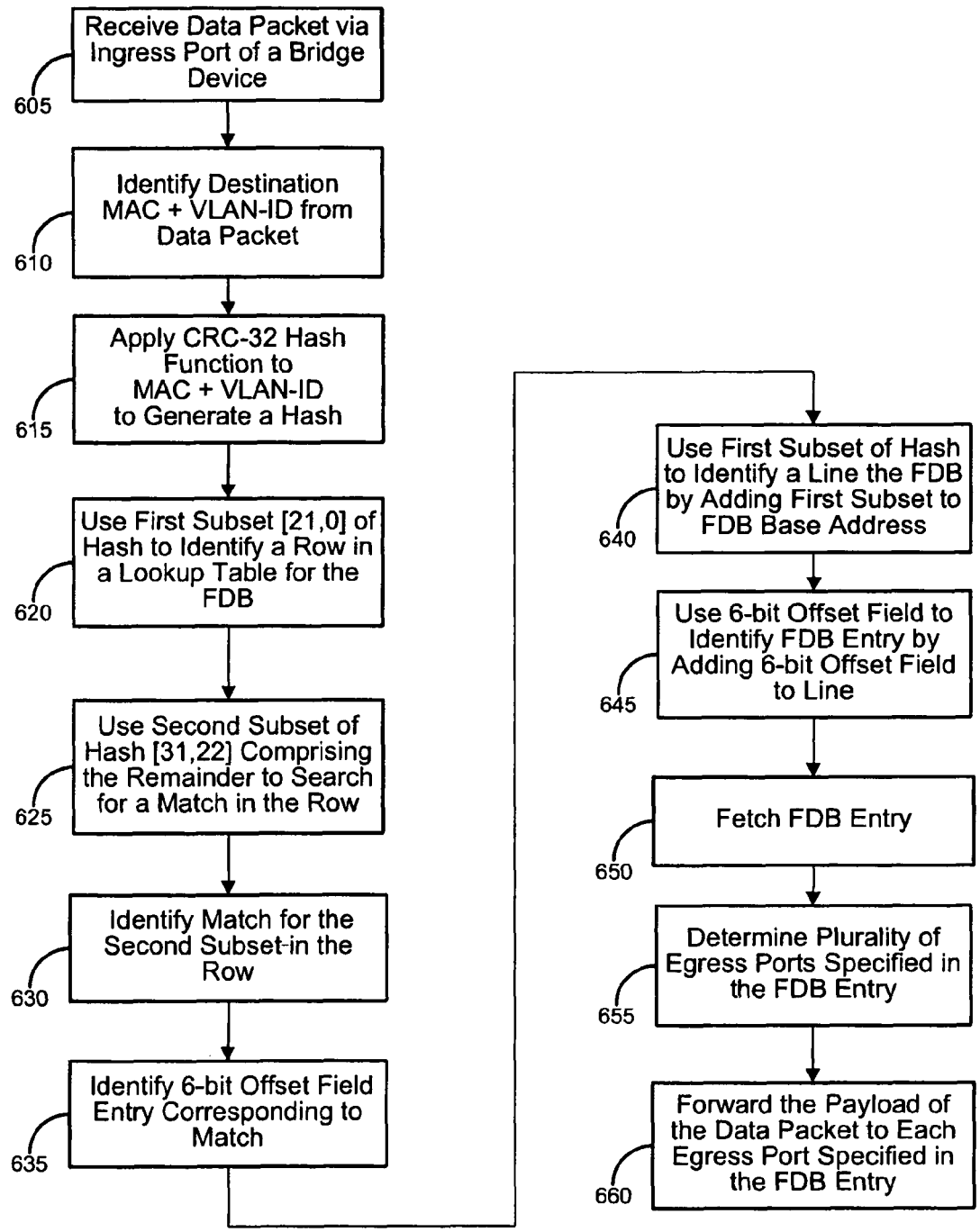
FIG. 6 is a flowchart illustrating an example of the double hash lookup mechanism according to various embodiments of the present invention.

FIG. 6 is a flowchart 600 of steps performed to determine an entry in a forwarding database, in accordance with another exemplary embodiment of the present invention. At step 605, a data packet is received via the ingress port of a bridge device. At step 610, the destination MAC address and VLAN-ID from the data packet are identified. At step 615, a CRC-32 hash function is applied to the MAC address and VLAN-ID to thereby generate a 32-bit hash. At step 620, a first subset of the hash comprising 22-bits [21,0] is used to identify a row in a lookup table for a forwarding database (FDB). At step 625, a second subset of hash comprising 10-bits [31,22] (the remainder) is used as a key to search for a match in the identified row.

At step 630, a match for the second subset is identified in the row, and at step 635, a 6-bit offset field entry corresponding to the match is identified. At step 640, the first subset of hash is used to identify a line in the FDB by adding the first subset to an FDB base address. At step 645, the 6-bit offset field is used to identify an entry in the FDB by adding a 6-bit offset field to the line. The FDB entry is fetched at step 650, and the plurality of egress ports specified in the FDB entry are determined at step 655. At step 660, the payload of the data packet is forwarded to each egress port specified in the FDB entry. Thus, the header may, or may not, be modified when the packet is forwarded.

Figure 7:
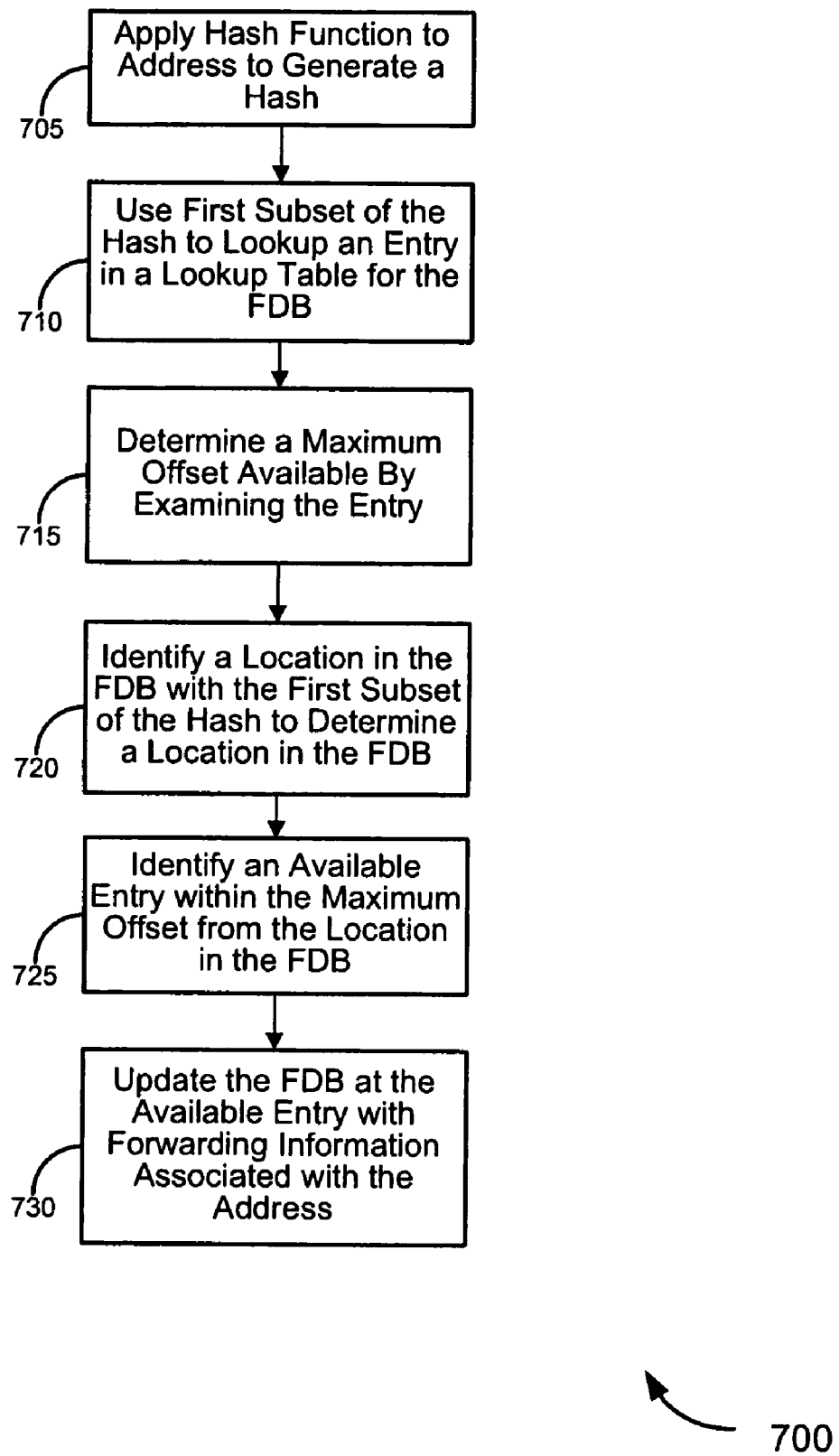
FIG. 7 is a flowchart illustrating a method of updating a forwarding database according to various embodiments of the present invention.

FIG. 7 is a flowchart 700 illustrating an exemplary method of updating a forwarding database according to various embodiments of the present invention. At step 705, a hash function is applied to data comprising an address, to thereby generate a hash. At step 710, a first subset of the hash is used to lookup an entry (e.g., a row) in a lookup table for a forwarding database (FDB). At step 715, a maximum offset available is determined by examining the entry. A second subset of the hash (or, more specifically, the field size thereof) may be used or otherwise referenced to search the entry to determine a maximum offset, or range of offsets, available. At step 720, a location in the FDB is identified using the first subset of the hash. In some embodiments, the first subset of the hash is added to an FDB base address to determine the location. At step 725, an available entry is determined in the FDB. An entry may be deemed available due to aging parameters, if it is empty, or via any other method as known in the art. The available entry will be within the maximum offset from the location in the FDB. At step 730, the FDB is updated at the available entry with forwarding information (e.g., a set of egress ports) associated with the address.

Figure 8:
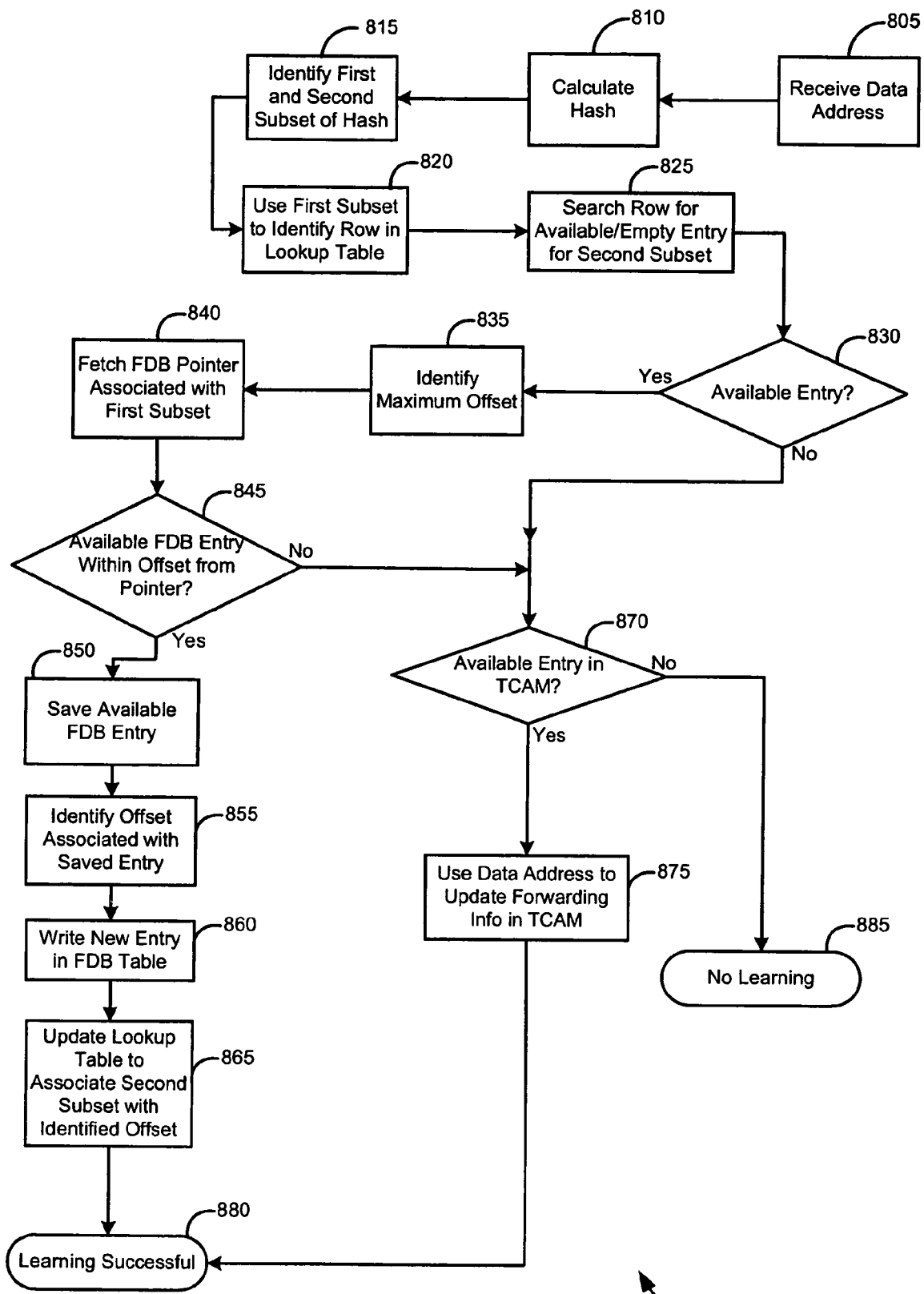
FIG. 8 is a flow diagram illustrating a method of updating a plurality of forwarding databases according to various embodiments of the present invention.

FIG. 8 illustrates an exemplary flow diagram 800 setting forth various methods of updating a number of forwarding databases according to various embodiments of the present invention. At step 805, a destination data address is received, associated with certain updated or new forwarding or handling information. It may, for example, comprise any of the destination address formats discussed above. At step 810, a hash function is applied to the data address to calculate a hash. At step 815, a first and second subset of hash are identified. At step 820, the first subset of the hash is used to identify a row in the lookup table. By way of example, the first subset may be added to a base address in the lookup table, or may otherwise be used as a key to search the lookup table, in a manner known in the art. Although, in this embodiment, the first subset identifies a row, in other embodiments the first subset may identify any number of rows or any other location(s) in the lookup table.

At step 825, the row is searched for an empty, or otherwise available, entry for the second subset. At step 830, a determination may be made as to whether an available entry exists for the second subset (e.g., in light of the field size). If so (i.e., "yes"), a maximum offset that can be associated with the second subset in the row is identified at step 835. In various embodiments, this may be a field of 5-7 bits, although offset field size may vary significantly depending on the particular implementation. At step 840, a pointer for the FDB is identified, and the pointer may be created by adding the first subset to a FDB base address. At step 845, it is determined whether there is an available entry in the FDB within the offset.

If there is an available FDB entry (i.e., "yes" at step 845), it is saved at step 850. At step 855, an offset (i.e., from the pointer) associated with the saved entry is identified. At step 860, a new (or revised) entry is written to the saved entry in the table. The entry comprises forwarding information, such as the egress port or ports associated with that destination address. At step 865, the lookup table is updated to associate a second subset with the identified offset. Thus, the row in the lookup table (identified by the first subset of the hash) may be modified to include the second subset of the hash and an association or other link to an offset field entry. The update/learning is then be deemed successful, at step 880.

Returning to step 830, if there is no available entry in the identified row in the lookup table (i.e., due to a number of hash collisions resulting from first subsets of hashes from different data address entries), a different database (e.g., comprising a TCAM) is searched for an available entry at step 870. Similarly, returning to step 845, if there is no available entry within the offset from the location (i.e., because that region of the FDB is filled with valid or unusable entries), the different database is searched for an available entry at step 870. If there is an available entry, at step 875, the forwarding information is learned, or otherwise updated, in the different database. In some embodiments, the data address itself comprises the key to search the database (while in other embodiments, a hash, or other alternative may be used). The update/learning is then deemed successful, at step 880. If there is no available entry in the different database, the forwarding information is not learned, at step 885. However, in alternative embodiments, other forwarding databases may be used for forwarding information storage as well.

Figure 9:
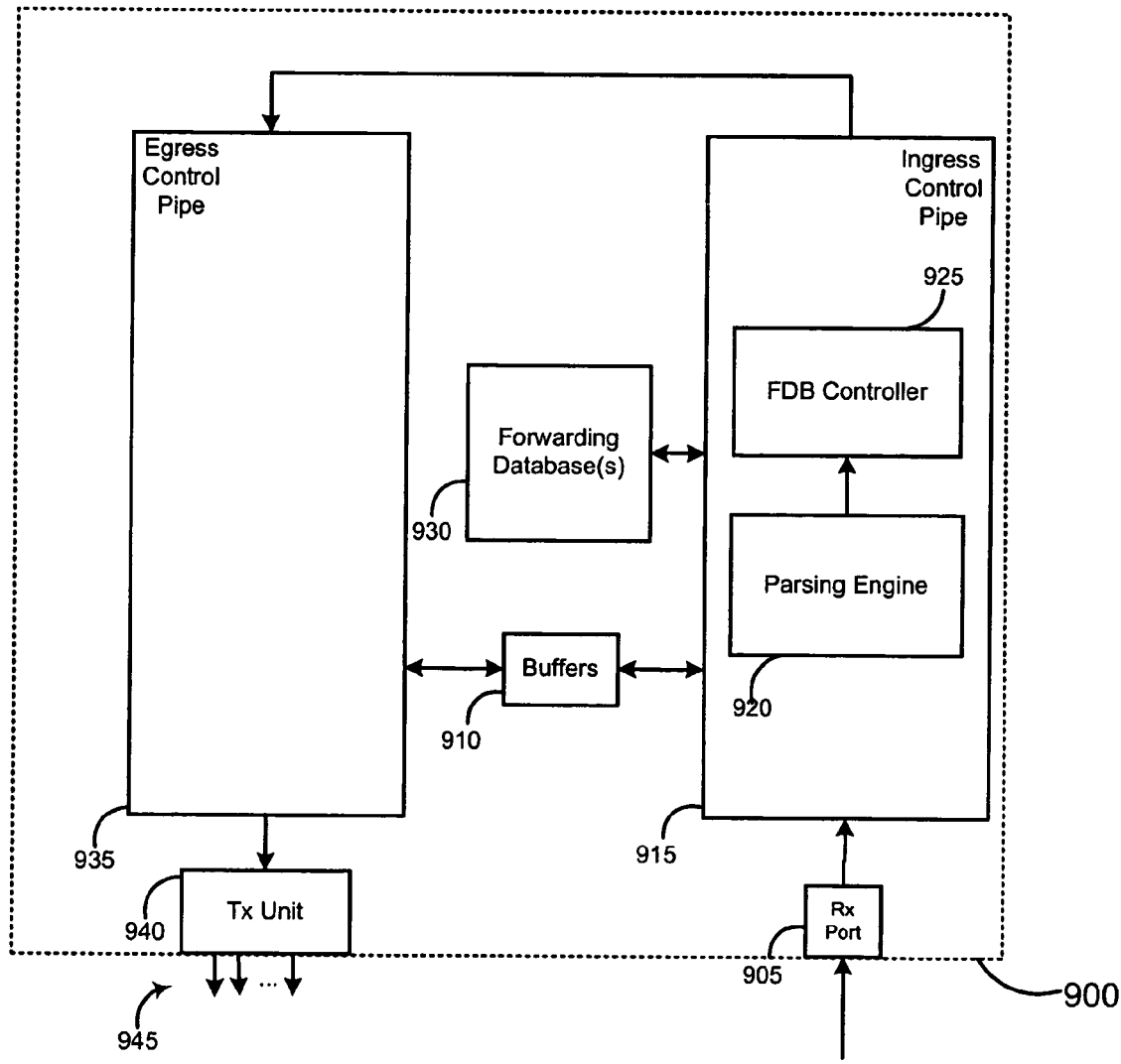
FIG. 9 is a block diagram illustrating an apparatus configured according to various embodiments of the present invention.

FIG. 9 is a simplified high-level block diagram of an apparatus 900 configured to identify an entry in a forwarding database, in accordance with one exemplary embodiment of the present invention. This drawing broadly illustrates how individual system elements of the apparatus of the invention may be implemented, whether in a separated or more integrated manner. The apparatus 900 may comprise a single integrated circuit. The exemplary apparatus 900 is shown including an ingress port 905. The port 905 is configured to receive a data packet. Information from the data packet is stored in the buffers 910. A parsing engine 920 is configured to identify data comprising an address from a packet received via the ingress port. This engine extracts the packet fields (e.g., VLAN-ID, MAC Source Address, MAC Destination Address, Source IP Address, Destination IP Address) that are used by the subsequent pipe engines.

The forwarding database (FDB) controller 925 is configured to perform various operations on the parsed address data, in conjunction with the forwarding databases 930. For purposes of FIG. 9, the forwarding databases 930 include the lookup tables, forwarding databases, and TCAMs discussed herein. The FDB controller 925 applies the hash function, and performs the various lookups and updates. Specifically, the forwarding database controller applies the hash function, splits the hash, uses the primary hash to identify a row in the lookup table, uses the secondary hash to identify an offset within the row, combines the offset with the primary hash to identify an entry in a forwarding database, and fetches the identified entry. The other lookup functions for other databases, as well as the updating functions discussed herein, are also performed by the FDB controller 925. In this embodiment, the parsing engine 920 and FDB controller 925 are part of an ingress control pipeline 915. Other functions may be performed by other engines with the ingress pipe 915 before, during, or after the parsing engine 920 and FDB controller 925 functions.

After processing by the ingress control pipe, information from the received packet is processed by the egress control pipe 935, which performs various filtering, replication, and queuing functions. A transmit unit 940 then transmits payload data from the received data packet through the one or more ports 945 specified in the FDB entry. Reference is made to different functions performed by different units, such as the parsing engine 920 and the FDB controller 925. These functions could be performed in any other separate processing units, or some or all could be performed in a single processing unit differently, which may be configured by program instructions for each function.

It should be noted that the methods, systems and devices discussed above are intended merely to be exemplary in nature. It must be stressed that various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow chart, a flow diagram, a data flow diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure.

Furthermore, while some embodiments may be implemented in hardware, others may be implemented in software, firmware, middleware, microcode, hardware description languages, or any combination thereof. When implemented in software, firmware, middleware or microcode, the program code or code segments to perform the necessary tasks may be stored in a machine readable medium such as a storage medium. One or more processors or processor cores may perform the necessary tasks. The description, therefore, should not be taken as limiting the scope of the invention, which is defined in the following claims.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be required before, or after, the above elements are considered. Accordingly, the above description should not be taken as limiting the scope of the invention, which is defined in the following claims.

What is claimed is:

1. A method of fetching an entry in a first forwarding database (FDB) of a network device, the method comprising:
applying a hash function to a first set of data to generate a hash;
using a first subset of the hash to select an entry in a lookup table;
using a second subset of the hash to identify an offset within the entry;
combining the offset with the first subset of the hash to identify an entry in the first FDB; and
fetching the identified entry.

2. The method of claim 1, further comprising:
forwarding payload data associated with the first set of data to at least one port specified by the identified entry in the FDB.

3. The method of claim 1, further comprising:
splitting the hash into first and second parts, the first part comprising the first subset and the second part comprising the second subset, wherein the second subset comprises all of the hash not included in the first subset.

4. The method of claim 1, further comprising:
applying the hash function to a second set of data to generate a second hash;
determining that the FDB does not contain valid forwarding directions, using at least a portion the second hash; and
identifying an entry in a second forwarding database, using at least a portion of the second set of data.

5. The method of claim 1, further comprising:
searching a second forwarding database; and
determining that the second forwarding database does not have a valid entry corresponding to the first set of data, wherein the determining step triggers the step of using the first subset of the hash to lookup the entry in the lookup table.

6. The method of claim 1, wherein the hash function comprises a cyclic redundancy check (CRC) hash.

7. The method of claim 1, wherein:
the lookup table comprises a plurality of rows and is searchable by the first subset of the hash;
the entry in the lookup table comprises one or more rows of the lookup table; and
the second subset of the hash is compared with data in the one or more rows to thereby identify the offset.

8. The method of claim 1, further comprising:
matching the second subset of the hash to data within the entry, wherein the data is associated with the data comprising the offset.

9. The method of claim 1, further comprising:
manipulating data produced by applying the hash function to create the hash.

10. The method of claim 1, wherein the network device is selected from the group consisting of a bridge, a switch, and a router.

11. A method of fetching a forwarding entry by accessing a plurality of forwarding databases, the method comprising:
applying a hash function to data comprising an address to generate a hash;
using a first subset of the hash to lookup an entry in a lookup table associated with a first one of the plurality of forwarding databases;
using a second subset of the hash to identify a set of data within the entry in the lookup table;
using the first subset of the hash and the set of data to identify an entry in the first one of the plurality of forwarding databases;
determining that the entry in the first one of the plurality of forwarding databases does not provide valid forwarding directions; and
using at least a part of the data to identify a forwarding entry in a second one of the plurality of forwarding databases.

12. The method of claim 11, further comprising:
forwarding payload bits disposed in the data to one or more egress ports specified by the forwarding entry.

13. The method of claim 11, wherein the second one of the plurality of forwarding databases is stored in Ternary Content Addressable Memory (TCAM).

14. The method of claim 13, wherein the TCAM includes a plurality of searchable keys and the data is matched with a first one of the plurality of searchable keys to identify the forwarding entry.

15. The method of claim 11, wherein:
the set of data comprises an offset applied from a location in the first one of the plurality of forwarding databases.

16. A method of learning an entry in a forwarding database (FDB), the method comprising:
applying a hash function to data comprising an address to generate a hash;
using a first subset of the hash to select an entry in a lookup table associated with the FDB;
determining, from the entry, a first offset;
identifying a location in the FDB using the first subset of the hash;
identifying an available entry within the first offset from the location in the FDB; and
updating the FDB at the available entry with forwarding information associated with the data.

17. The method of claim 16, further comprising:
identifying a second offset from the location in the FDB to the available entry; and
updating the entry in the lookup table by associating a second subset of the hash with the second offset.

18. The method of claim 16, further comprising:
applying the hash function to a second set of data comprising an address to generate a second hash;
determining, with use of a first subset of the second hash and a second subset of the second hash, that the FDB does not contain a second available entry for the second set of data;
identifying the second available entry in a second forwarding database; and
updating the second available entry in the second forwarding database with forwarding information associated with the second set of data.

19. The method of claim 16, wherein the available entry comprises an entry that is determined to be invalid because of aging.

20. An apparatus for forwarding data packets as indicated by a forwarding database (FDB), the apparatus comprising:
an ingress port;
a plurality of egress ports;
a parsing engine configured to identify a first set of data comprising an address from a packet received via the ingress port; and
a forwarding database controller configured to:
apply a hash function to the first set of data to generate a hash;
use a first subset of the hash to select an entry in a lookup table;
use a second subset of the hash to identify an offset within the entry;
combine the offset with the first subset of the hash to identify an entry in the first FDB; and
fetch the identified entry.

21. The apparatus of claim 20, further comprising:
a transmit unit configured to forward payload data associated with the first set of data to at least one port specified by the identified entry in the FDB.

22. The apparatus of claim 20, wherein the forwarding database controller is further configured to:
split the hash into first and second parts, the first part comprising the first subset and the second part comprising the second subset, wherein the second subset comprises all of the hash not included in the first subset.

23. The apparatus of claim 20, wherein the forwarding database controller is further configured to:
apply the hash function to a second set of data to generate a second hash;
determine that the FDB does not contain valid forwarding directions, using at least a portion the second hash; and
identify an entry in a second forwarding database, using at least a portion of the second set of data.

24. The apparatus of claim 20, wherein the forwarding database controller is further configured to:
search a second forwarding database; and
determine that the second forwarding database does not have a valid entry corresponding to the first set of data, thereby triggering the use of the first subset of the hash to lookup the entry in the lookup table.

25. The apparatus of claim 20, wherein the hash function comprises a cyclic redundancy check (CRC) hash.

26. The apparatus of claim 20, wherein:
the lookup table comprises a plurality of rows and is searchable by the first subset of the hash;
the entry in the lookup table comprises one or more rows of the lookup table; and
the second subset of the hash is compared with data in the one or more rows to thereby identify the offset.

27. The apparatus of claim 20, wherein the forwarding database controller is further configured to:
match the second subset of the hash to data within the entry, wherein the data is associated with the data comprising the offset.

28. The apparatus of claim 20, wherein the forwarding database controller is further configured to:
manipulate data produced by applying the hash function to create the hash.

29. The apparatus of claim 20, wherein the apparatus is selected from the group consisting of a bridge, a switch, and a router.

30. An apparatus fetching a forwarding entry by accessing a plurality of forwarding databases, the apparatus comprising:
an ingress port;
a plurality of egress ports;
a parsing engine configured to identify data comprising an address from a packet received via the ingress port; and
a forwarding database controller configured to:
apply a hash function to the data to generate a hash;
use a first subset of the hash to select an entry in a lookup table associated with a first one of the plurality of forwarding databases;
use a second subset of the hash to search the entry for an offset applicable to the first one of the plurality of forwarding databases;
determine that the first one of the plurality of forwarding databases does not provide valid forwarding directions; and
use at least a part of the data to identify a forwarding entry in a second one of the plurality of forwarding databases.

31. The apparatus of claim 30, further comprising a transmit unit configured to forward payload bits disposed in the data to one or more egress ports specified by the forwarding entry.

32. The apparatus of claim 30, wherein the second one of the plurality of forwarding databases is stored in Ternary Content Addressable Memory (TCAM).

33. The apparatus of claim 32, wherein the TCAM includes a plurality of searchable keys and the data is matched with a first one of the plurality of searchable keys to identify the forwarding entry.

34. The apparatus of claim 30, wherein the forwarding database controller is further configured to:

apply the offset to a location in the first one of the plurality of forwarding databases, the location identified by the first subset of the hash; and identify an invalid forwarding entry in the first forwarding database with application of the offset.

35. An apparatus for learning an entry in a forwarding database (FDB), the apparatus comprising a forwarding database controller configured to:

apply a hash function to data comprising an address to generate a hash; use a first subset of the hash to select an entry in a lookup table associated with the FDB; determine, from the entry, a maximum first offset;

identify a location in the FDB using the first subset of the hash;

identify an available entry within the first offset from the location in the FDB; and update the FDB at the available entry with forwarding information associated with the data.

36. The apparatus of claim 35, wherein the forwarding database controller is further configured to:

identify a second offset from the location in the FDB to the available entry; and update the entry in the lookup table by associating a second subset of the hash with the second offset.

37. The apparatus of claim 35, wherein the forwarding database controller is further configured to:

apply the hash function to a second set of data comprising an address to generate a second hash;

determine, with use of a first subset of the second hash and a second subset of the second hash, that the FDB does not contain a second available entry for the second set of data;

identify the second available entry in a second forwarding database; and update the second available entry in the second forwarding database with forwarding information associated with the second set of data.

38. The apparatus of claim 35, wherein the available entry comprises an entry that is determined to be invalid because of aging.

* * * * *